US008635961B2

(12) United States Patent
Morellini

(10) Patent No.: US 8,635,961 B2
(45) Date of Patent: Jan. 28, 2014

(54) PROFILING METHOD AND APPARATUS

(76) Inventor: Daryl Morellini, Ingham (AU)

( * ) Notice: Subject to any disclaimer, the term of this patent is extended or adjusted under 35 U.S.C. 154(b) by 264 days.

(21) Appl. No.: 12/671,049

(22) PCT Filed: Dec. 9, 2008

(86) PCT No.: PCT/AU2008/001367
§ 371 (c)(1),
(2), (4) Date: Jan. 28, 2010

(87) PCT Pub. No.: WO2009/015442
PCT Pub. Date: Feb. 5, 2009

(65) Prior Publication Data
US 2011/0011316 A1   Jan. 20, 2011

(30) Foreign Application Priority Data

Jul. 30, 2007   (AU) ............................... 2007904041

(51) Int. Cl.
| | |
|---|---|
| *A01B 49/06* | (2006.01) |
| *A01B 13/02* | (2006.01) |
| *A01B 49/04* | (2006.01) |
| *A01B 79/02* | (2006.01) |
| *A01C 5/06* | (2006.01) |
| *A01C 5/08* | (2006.01) |
| *A01C 7/06* | (2006.01) |

(52) U.S. Cl.
USPC ........................... 111/154; 111/193; 111/195

(58) Field of Classification Search
USPC .................................. 111/154, 149, 190–195
See application file for complete search history.

(56) References Cited

U.S. PATENT DOCUMENTS

| | | | | | |
|---|---|---|---|---|---|
| 3,815,684 | A | * | 6/1974 | Smith | 172/694 |
| 4,702,323 | A | * | 10/1987 | Smit et al. | 172/156 |
| 4,974,683 | A | * | 12/1990 | Hanig et al. | 172/156 |
| 5,082,063 | A | * | 1/1992 | Sidders | 172/57 |
| 5,375,542 | A | * | 12/1994 | Schaffert | 111/192 |
| 5,660,126 | A | * | 8/1997 | Freed et al. | 111/140 |

FOREIGN PATENT DOCUMENTS

| | | | | |
|---|---|---|---|---|
| FR | 570921 | A2 | * | 4/1986 |
| GB | 2079572 | A | * | 1/1982 |
| WO | WO 2006133697 | A1 | * | 12/2006 |

* cited by examiner

*Primary Examiner* — Christopher J Novosad
(74) *Attorney, Agent, or Firm* — Rick B. Yeager

(57) ABSTRACT

A method and apparatus (10) for forming in a single pass operation, a profiled planting mound for growing of a crop from planted seeds or billets by using a pair of spaced tools (37) to displace soil inwardly towards each other. A central bed is formed between the displaced soil onto which billets or seeds may be deposited through a guide or chute (13). Covering discs (78,79) are provided to move soil to cover the billets or seeds and a press wheel assembly (81) is used for pressing the soil in the mound and form the desired profile in the mound.

12 Claims, 7 Drawing Sheets

PROFILING METHOD AND APPARATUS

TECHNICAL FIELD

This invention relates to a profiling method and apparatus and in particular to a method and apparatus for forming a profiled planting bed or mound for growing of various agricultural products. The present invention in a particular but not exclusive aspect relates to a method and apparatus for forming a planting bed or mound for cane billets. The present invention in a further particular aspect relates to a cane billet planter providing with profiling apparatus.

BACKGROUND ART

Conventional apparatus for planting cane billets plant billets in a furrow or concavity formed in the soil. For this purpose furrows are initially formed in the soil by suitable earth working tools and a billet or wholestalk planter is used to deposit the billets in the furrows after which the soil is compacted around the planted billets. The above procedures have a number of disadvantages. In particular, formation of the furrows, planting of the billets and compacting of the soil is obviously a time consuming procedure and thus is costly due to labour required. Furthermore, fuel costs are high due to the number of tractor passes along a row which are required for conventional planting. In addition, where a row mound is formed prior to billet planting, soil forming the mound can become compacted prior to billet planting. Further, billet losses can occur when planting in furrows and during wet weather. Thus in the case of heavy rain, furrows fill up with water resulting in plant losses for example due to cane billets rotting which causes eyes or buds not to grow. Cane stools can also be run over due to narrow conventional width rows.

SUMMARY OF THE INVENTION

The present invention aims to provide in one aspect a profiling method and apparatus for forming a mound or bed for growing of agricultural crops which overcomes or alleviates one or more of the above disadvantages or which at least provides an alternative to known planting methods and apparatus. The present invention in another aspect aims to provide planting apparatus which incorporates profiling apparatus. Other objects and advantages of the invention will become apparent from the following description.

The present invention thus provides in one preferred aspect, a method of forming in a single pass operation, a profiled bed or mound for growing of crops, said method comprising the steps of providing a pair of spaced apart soil engaging tools adapted to displace soil inwardly towards each other, depositing seed or billets of a crop between said displaced soil, covering said deposited seed or billets with soil to form a raised mound having a central apex and convex configuration in cross section and pressing said soil in said mound.

Preferably the step of covering of the seed or billets comprises the step of moving soil over the seed or billets from opposite sides during the pass.

Preferably the step of pressing the soil in the mound comprises the step of rolling the soil moved over the seed or billets.

Typically the method of the invention is used for the planting of sugar cane billets but may be used for the planting of other crops or plants and thus the term "seed or billets" as used through the specification includes all propagative parts of plants including tubers and bulbs. When used for the planting of sugar cane billets, the method of the invention may include the step of forming longitudinally extending rills or furrows for locating the billets longitudinally relative to the mound row. This step may also include the introduction of fertilizer into the soil, to assist in growing of the crop.

The present invention in another preferred aspect provides profiling apparatus for forming a profiled mound for growing of crops, said apparatus comprising a pair of spaced part soil engaging tools, said tools being adapted to displace soil inwardly towards each other as said apparatus is advanced, covering means for covering seed or billets deposited between said soil displaced by said tools to form a raised mound having a central apex and convex cross section and means for pressing said soil in said mound, said profiling apparatus being adapted to form said profiled mound in a single pass operation.

The tools suitably comprise mould or profiling board assemblies. Preferably each mould or profiling board assembly included a pair of mould or profiling boards which may be of diverging or V-shaped configuration in plan view. Preferably the inner mould boards of the respective mouldboard assemblies or the leading parts of the tools are adapted to displace soil inwardly to form spaced hills or mounds as the apparatus is advanced between which the seed or billets are deposited.

Preferably means are provided for forming a planting bed with a substantially planar surface on which the seeds or billets may be deposited.

The covering means suitably comprise covering discs for covering the seed or billets with soil, the covering discs moving or throwing soil over the seed or billets as the planter is advanced. The covering discs suitably comprise two spaced pairs of discs.

Preferably the means for pressing the soil moved over the seed or billets comprises a press wheel assembly mounted rearwardly of the covering means. The press wheel assembly suitably comprises at least one pair of press wheels which preferably have their axes of rotation inclined downwardly and outwardly relative to the horizontal to help press the mound into a convex configuration. The press wheel assembly preferably comprises two pairs of press wheels. The pairs of press wheels may comprise a pair of leading press wheels and a pair of trailing press wheels arranged symmetrically relative to the mound. Preferably the leading press wheels extend outwardly of the trailing press wheels. Alternatively, the two pairs of press wheels may be transversely aligned with each other and mounted on a common shaft which is angled outwardly and downwardly at each end.

Preferably the profiling apparatus includes a frame assembly to which the tools are mounted. The profiling apparatus is suitably adapted to be mounted at the forward end of a planter or a planter may incorporate the profiling apparatus.

The frame assembly is suitably adapted for at least limited floating movement in a substantially vertical direction. Preferably the frame assembly is supported by one or more depth wheels which support the frame assembly to the ground and permit the frame assembly to follow the ground contour. Preferably the one or more depth wheels are adjustable relative to the floating frame assembly to adjust the operating depth of the mound forming means. The one or more depth wheels may comprise a pair of wheels mounted to opposite sides of the floating frame assembly. The pair of wheels may be laterally adjustable relative to the floating frame assembly. The one or more depth wheels may also comprise a central pair of depth wheels.

Preferably the soil engaging tools are adapted to move soil inwardly to enable formation of a broad planting mound centrally of the profiling apparatus and planter which extends between the wheels of the prime mover to which the planter is mounted. Suitably the mould boards of the mould board assemblies are adjustable about a horizontal pivot axis. Suitably also the mould boards are mounted for adjustable pivotal movement towards and away from each other. Each soil engaging tools suitably also include a leading tip or point for penetration the ground, the tip or point diverging rearwardly. The tip or point may be provided with a leading tip portion adapted to permit the soil engaging tool to pass or jump an obstruction such as a stump or cause the tool to ride up over a hard surface such as when a paddock or field is not square by lifting of the floating frame assembly. Suitably the mould or profiling boards and the tip or point are mounted to a tool shank which is substantially upright.

The floating frame assembly suitably includes at least one tool bar which extends transversely of the profiling apparatus and substantially at right angles to the normal direction of movement of the apparatus. Preferably the floating frame assembly includes a pair of tool bars arranged at different heights. Suitably the tool shanks are mounted and preferably adjustably mounted to the tool bar or bars. Preferably the tool bar or bars extend between and are connected to opposite side members. Preferably the side members are adapted to be mounted directly or indirectly to the planter for movement in opposite substantially vertical direction. Preferably the side members are connected directly or indirectly to the planter by pairs of substantially parallel arms which are pivotally mounted to the side members and planter respectively so as to guide movement of the floating frame assembly in parallelism relative to the planter.

Preferably the profiling apparatus also includes a main fixed frame adapted to be rigidly mounted to the planter. Preferably the fixed frame is adapted to be connected to a prime mover such as a tractor assembly by a three-point linkage. The fixed frame suitably includes mounting brackets or lugs for connection to a three-point linkage.

Preferably the fixed frame extends between the upper and lower tool bars to limit floating movement of the floating frame assembly. The fixed frame suitably includes a transverse main frame member and opposite side frame members adapted to be rigidly connected to the planter. Preferably the pairs of parallel arms are connected at one end to the opposite side frame members of the main frame.

The present invention in a further aspect provides a cane billet planter having profiling apparatus as described above. The planter suitably includes a planting guide or chute arranged centrally relative to the profiling apparatus for guiding billets to be planted into a planting bed formed between the soil displaced by the tools of the profiling apparatus which is formed into spaced hills or mounds. Means may also be provided for directing fertilizer or the like into the planting bed. The guide or chute suitably forms a drill and has leading surfaces adapted to penetrate the soil and displace soil to form a planting bed having a top surface onto which the billets may be deposited with soil displaced by the tools on the profiling apparatus being channeled between the tools and guide or chute on opposite sides of the bed. Preferably the leading surface of the guide or chute comprise a pair of walls or faces which are angled to each other and which extend rearwardly at a diverging angle from a centrally arranged leading end at which the walls join.

The guide or chute may also include rake means for mixing fertilizer into the soil of the bed. The rake means may also form rills or furrows for locating cane billets which can lie substantially longitudinally of and be aligned with the rills or furrows which extend longitudinally of the mound. The rake means suitably include a series of prongs for forming the rills or furrows. The rake means may be mounted for limited pivotal movement about a substantially horizontal axis. Return means may be provided to return the rake means to its operative position after pivoting thereof. The return means may comprise a spring or springs or hydraulic or pneumatic return means.

The planter preferably supports on its trailing end the billet covering means which suitably comprise covering discs for covering the cane billets deposited onto the bed with soil, the covering discs moving or throwing soil over the billets as the planter is advanced. The covering discs suitably comprise two pairs of discs on opposite sides of the planter. Suitably the discs of each pair are arranged relative to each other to form a desired mounded profile in the soil which is subsequently pressed to compress the soil into the final profile. The discs are suitably angled relative to the direction of normal movement of the planter. Suitably the discs cooperate with each other to form a raised apex in the soil therebetween.

The planter further suitably carries the press wheel assembly to press the soil over the billets. The covering discs and press wheel assembly may be mounted to a transversely extending tool bar at the rear of the planter. The press wheel assembly suitably is aligned longitudinally with the chute or guide and as referred to above suitably comprises two pairs of press wheels. Suitably the press wheels of the first and second pair cooperate to press the soil in the mound. The press wheels are suitably angled to the horizontal such that the compressed soil outwardly from the central apex is angled outwardly and downwardly. The press wheels may be on a common axle or one pair of press wheels may lead and be disposed outwardly of the other pair.

BRIEF DESCRIPTION OF THE DRAWINGS

In order that the invention may be more readily understood and put into practical effect; reference will now be made to the accompanying drawings which illustrate a preferred embodiment of the invention described in connection with a billet planter for sugar cane. The invention however may be applied to any other planting apparatus where a row mound or bed is to be formed for planting seeds or billets. In the drawings.

DETAILED DESCRIPTION OF THE PREFERRED EMBODIMENT

Figure 1:
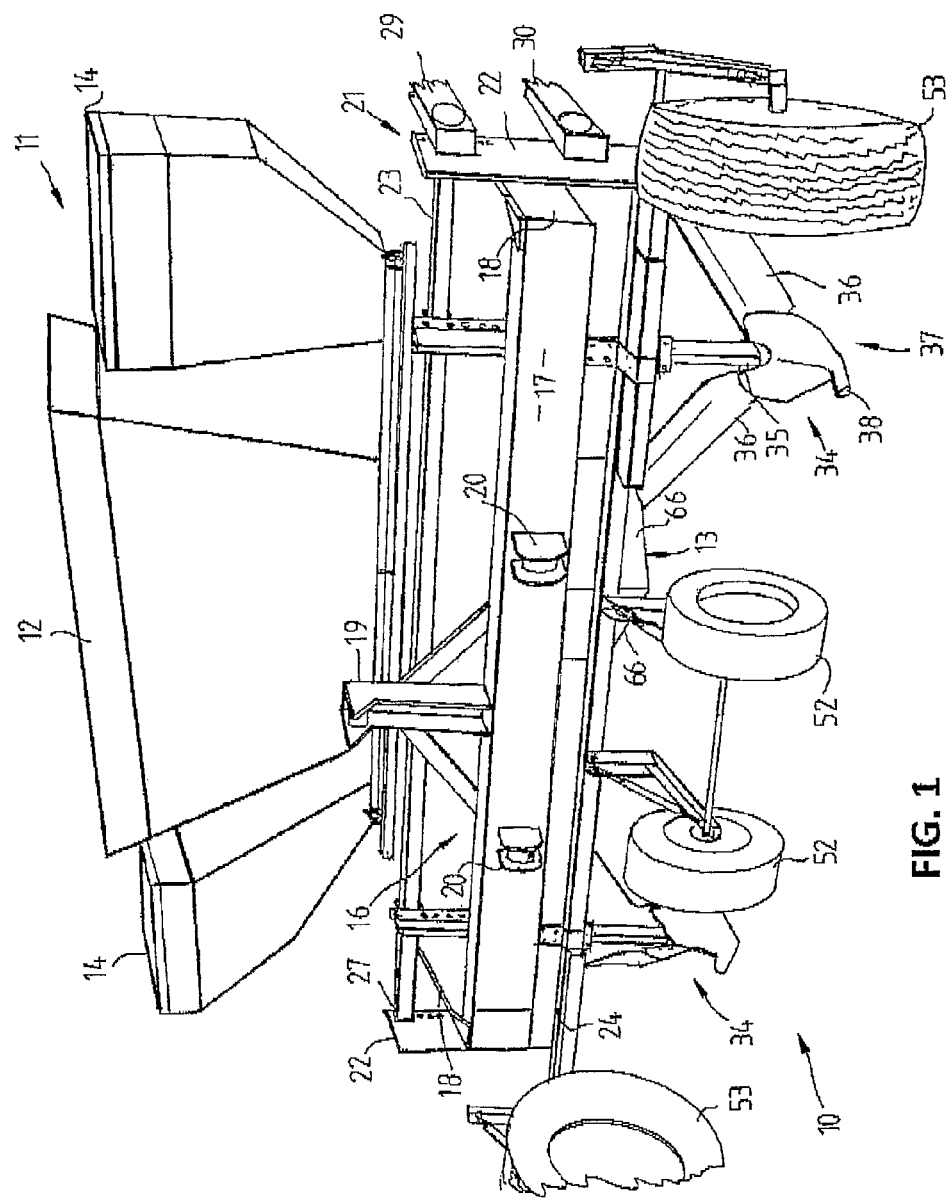
FIG. 1 is front view of the profiling apparatus according to an embodiment of the invention mounted to a cane billet planter.
Figure 2:
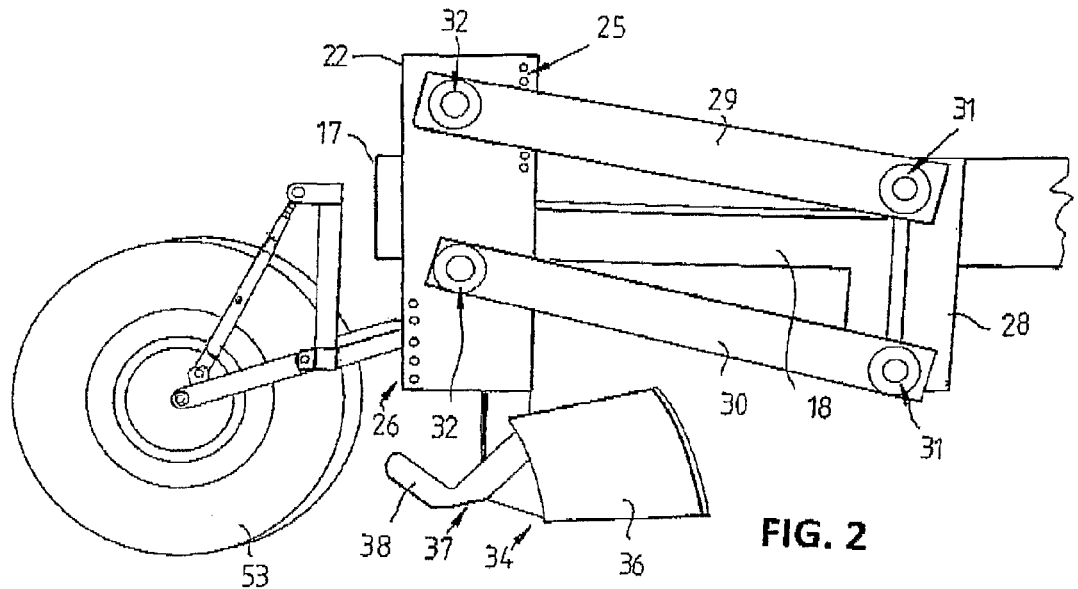
FIG. 2 is a side view of the apparatus of FIG. 1.
Figure 8:
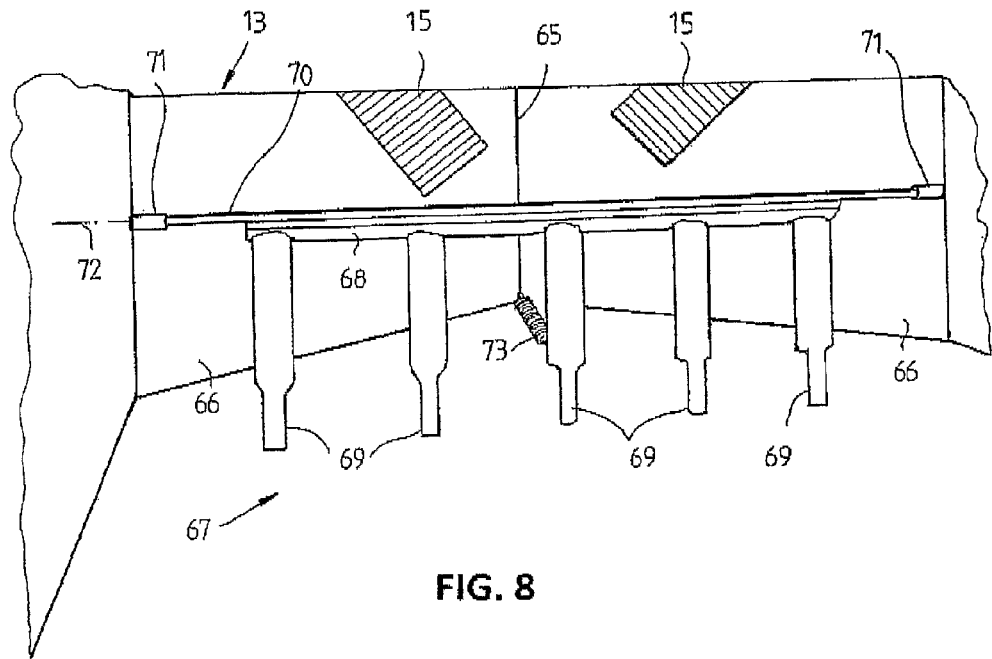
FIG. 8 illustrates a planting guide or chute of the planter from the rear.

Referring to the drawings and firstly to FIGS. 1 and 2 there is illustrated a profiling apparatus 10 according to an embodiment of the present invention which is adapted to be mounted to the leading end of a planter 11, the planter 11 in this embodiment comprising a billet planter for planting billets of sugar cane held within a central bin 12 on the planter 11. A guide or chute 13 (see also FIG. 8) at the lower end of the bin 12 is adapted to guide billets from the bin 12 to the ground. The guide or chute 13 serves as a planting drill to form a substantially flat bed typically to a depth of approximately 50 mm upon which the billets are deposited. The planter 11 also carries a pair of fertilizer bins 14 provided on opposite sides of the central planter bin 12 for controlled application of fertilizer through ducts 15 (see FIG. 8) into the shroud or guide 13 for mixing with soil prior to the billets falling into the formed flat bed.

The profiling apparatus 10 has a main fixed frame assembly 16 which includes a main transversely extending frame member 17 and a pair of side arms 18 which are fixed rigidly to and extend rearwardly from the main frame member 17 for connection to opposite sides of the planter 11 respectively by bolting or the like. The main frame 16 thus extends forwardly from the planter 11 such that the main frame member 17 is fixedly supported to the planter 11 to extend substantially at right angles to the normal direction of movement of the planter 11. The main frame member 17 supports a central upper mounting lug or bracket 19 and a pair of lower opposite side lugs or brackets 20 to enable the apparatus 10 to be connected to a conventional three-point linkage of a tractor or other prime mover.

The profiling apparatus 10 additionally includes a floating frame assembly 21 (see also FIG. 2) which comprises a pair of opposite spaced apart side plates 22 and upper and lower elongated tool bars 23 and 24 which are substantially parallel to the transverse frame member 17 of the fixed main frame assembly 16 and which are positioned above and below the side arms 18 of the main frame assembly 16. The side plates 22 are provided with a series of apertures 25 and 26 positioned along their trailing upper side and leading lower side respectively and the tool bars 23 and 24 are provided with brackets 27 at opposite ends thereof which allow mounting of the tool bars 23 and 24 at different positions to the side plates 22 by bolting through selected apertures 25 and 26. The upper tool bar 23 as is apparent is spaced above but offset rearwardly from the lower tool bar 24 due to the connection of the upper tool bar 23 to the mounting apertures 25 positioned rearwardly from but above the mounting apertures 26.

Each side arm 18 of the main fixed frame assembly 16 includes or supports a generally upright mounting bracket 28 which defines a mount for the respective corresponding ends of a pair of similar parallel arms 29 and 30 which are mounted to the mounting bracket 28 by respective spherical bearings 31 at mounting points which are substantially vertically aligned. The other corresponding ends of the arms 29 and 30 are mounted at spaced apart positions by further spherical bearings 32 to the side brackets 22 of the floating frame assembly 21 at mounting points which are also substantially vertically aligned such that the side brackets 22 with attached tool bars 23 and 24 are capable of substantially vertical floating movement in opposite directions due to the parallel linkage assembly defined by the arms 29 and 30, bracket 28 and side plate 22.

Figure 3:
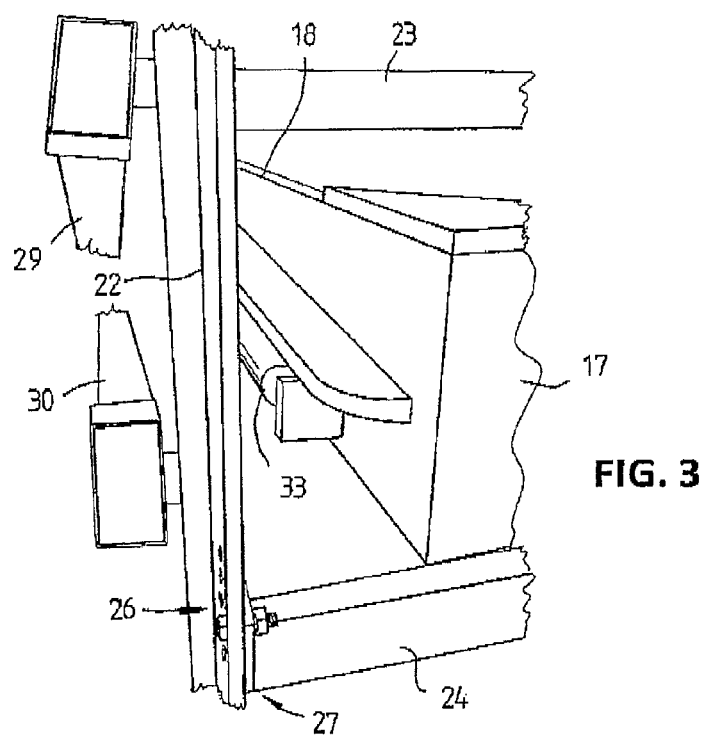
FIG. 3 is an end view showing the relationship between the floating frame assembly and fixed frame assembly of the apparatus.

The floating movement of the floating frame assembly 21 is limited by abutment of the upper tool bar 23 with the upper sides of the side frame members 18 and abutment of the lower tool bar 24 with the lower sides of the side frame members 18 as is apparent in FIG. 3. The extent of floating movement of the floating frame assembly 21 can be adjusted by adjusting the position of connection of the tool bars 23 and 24 to the side plates 22 at the mounting apertures 25 and/or 26. The side frame members 18 also support respective rollers 33 which are mounted for rotation about axes extending longitudinally of the frame members 18 and which are positioned between the side frame members 18 and side plates 22 and which provide support to the side plates 22 for smooth movement thereof in opposite vertical directions.

Figure 4:
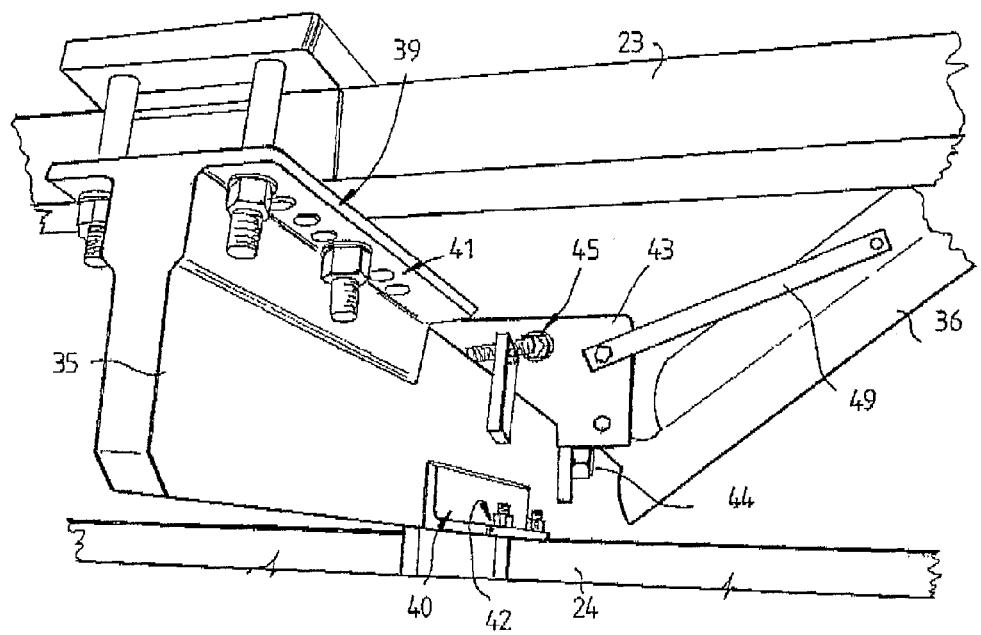
FIG. 4 is a top view of a mould board assembly and its mounting to the tool bars.

Mounted to the tool bars 23 and 24 are a pair of spaced apart earth engaging tools 34, each including an upright shank 35 and a pair of diverging mould or profiling boards 36 of curved configuration in cross section and adjustable to a generally V-shaped in plan view at the lower end of each support shank 35 as also shown in FIG. 4. The shank 35 also supports a central plough tip or point 37 for penetrating the soil, the tip or point 37 also including an upwardly angled leading tip portion 38 and diverging rearwardly from the leading portion 38. If the tip 37 encounters an obstruction such as a stump, the tip portion 38 will cause the floating frame assembly 21 to lift upwardly due to the pivotally connected parallel arms 29 and 30 to enable the obstruction to be passed. The tip portion 38 is also used to ride on a hard surface such as an unsquare headland and lift the floating frame assembly 21 in passage over such a surface. This will usually only happen when the headland is not perpendicular to the planting paddock such as where the paddock is triangular where each row is shorter than the previous row.

The tool shank 35 is provided with upper and lower brackets 39 and 40 at its leading and trailing end for mounting of the tool shank 35 to the trailing and leading tool bars 23 and 24 respectively. The brackets 39 and 40 are provided with a series of apertures 41 and 42 to enable the tool shank 35 and thus the tip 37 and mould boards 34 to be mounted at different operative heights. The shank 35 is provided at its lower end with a mould board mounting bracket 43 which is pivotally mounted to the shank 35 at pivot 44 for pivotal movement about a substantial horizontal axis. A screw jack 45 is connected between the bracket 43 and shank 35 to allow tilting adjustment of the bracket 43 and mould boards 36 mounted thereto. The mould boards 36 are stiffened on their rear side by a channel or flanges 46 and pairs of lugs 47 are provided at the leading ends of the boards 36 for pivotal mounting of the boards 36 to the respective brackets 43 by means of pivot pins or bolts 48 for movement about a generally upright axis. Spreader bars 49 are pivotally connected at one end to the bracket 43 and at their other ends to the channels or flange 44 through elongated slots 50 in a flange 44 of the mould boards 36 by means of clamp blots 51. Loosening of the clamp bolts 51 allows sliding movement of the bolts along the slots 50 to thereby permit the mould boards 36 to be pivoted about the pivot pins or bolts 48 towards and away from each other.

Figure 6:
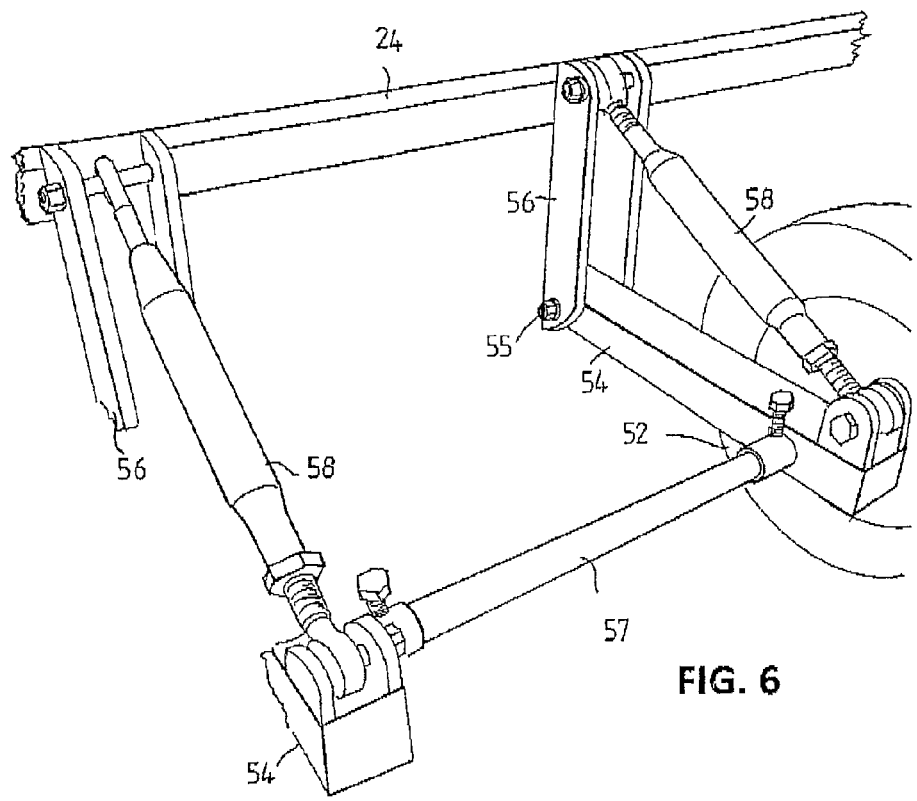
FIG. 6 illustrates the central depth wheels of the apparatus.

Inner and outer pairs of rubber tired depth wheels 52 and 53 are provided to support and guide the apparatus 10 and control the depth of operation of the mould board assemblies 34. The inner pairs of wheels 52 as shown in FIG. 6 are mounted for rotation at the trailing end of respective pivot arms 54 which are pivotally mounted at 55 to brackets 56 which are mounted to the lower tool bars 24 and depend downwardly therefrom for pivotal movement about a substantially horizontal axis. A cross arm 57 extends between and is connected to the respective pivot arms 54 such that the arms 54 are connected for movement with each other. Turnbuckles 58 are connected between the pivot arms 54 and brackets 56 allow for adjustment of the depth wheels 52 relative to the tool bars 24 to adjust the operating depth of the mould board assemblies 34.

Figure 7:
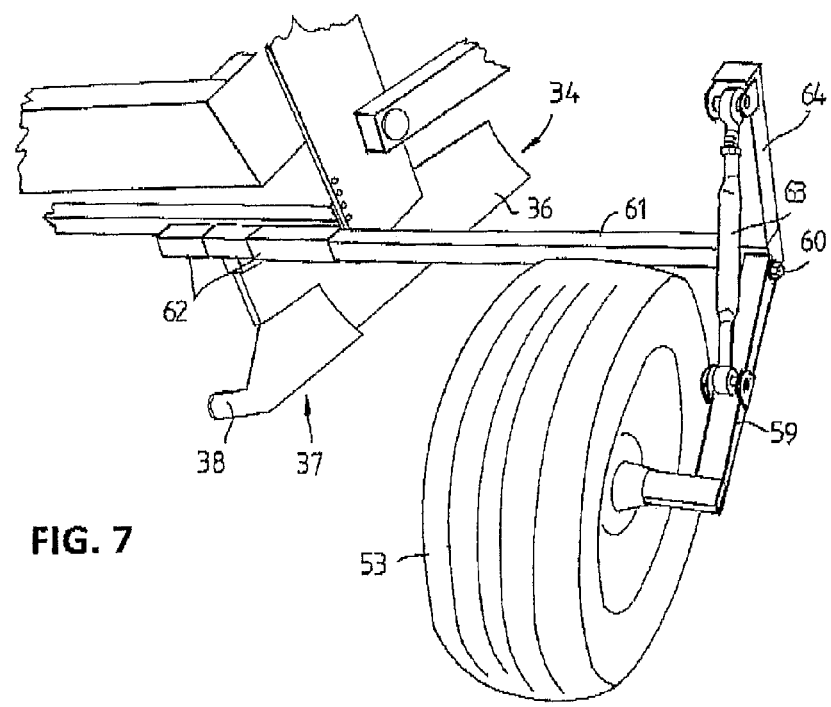
FIG. 7 illustrates an outer depth wheel of the apparatus.

Each outer depth wheel 53 as shown in FIG. 7 is mounted to the rear end of a pivot arm 59 which is pivotally mounted at its inner end at 60 to an extension arm 61 which is mounted to the lower tool bar 24 via spaced sleeves 62 so as to be extendable relative to the tool bar 24 and substantially parallel to the tool bar 24. The arm 61 may be pinned to the sleeves 62 at a selected extended position to adjust the lateral position of the outer wheel 53. A turnbuckle 63 is connected between the pivot arm 58 and an upright arm 64 fixed to the end of the extension arm 60 to enable adjustment of the depth wheel 53. A similar arrangement is provided on the opposite side of the apparatus 10. As is apparent in FIG. 1, the mould board assemblies 34 are arranged between respective inner and outer depth wheels 52 and 53.

The guide or chute 13 which is arranged centrally of the planting apparatus 10 has a leading apex 65 and angled side was 66 which extend rearwardly from the leading apex 65, the walls 66 extending at an obtuse angle to each other. The lower ends of the angled walls 66 penetrate the soil such that as the apparatus 10 is advanced they push soil to opposite sides and form a substantially flat upper surface or bed in the mound. Extending between the walls 66 is a rake assembly 67 which includes a support arm 68 and a series of spaced apart prongs or tynes 69 extending downwardly from the support arm 68. The support arm 68 is mounted to an elongated pivot arm 70 to extend longitudinally thereof, opposite ends of the arm 68 being mounted to pivots 71 provided on opposite side walls of the chute 13 such as to be capable of pivoting movement about a substantially horizontal axis 72. A return spring 73 is connected between the central prong 69 and the leading end of the guide or chute 13 at or adjacent the apex 65. The prongs 69 are thus capable of pivoting rearwardly for example if they strike an obstruction however the spring 73 will return the prongs 69 to their operative position illustrated in FIG. 8. Fertilizer is directed into the guide or chute 13 forwardly of the rake assembly 67 by the ducts 15 connected to the fertilizer bins 14.

Figure 10:
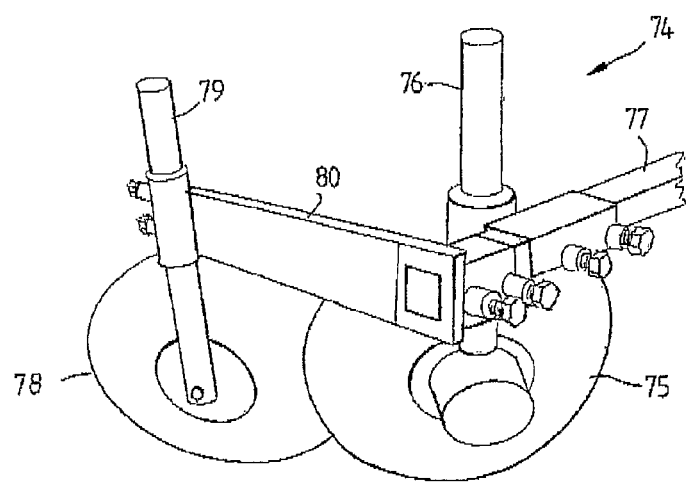
FIG. 10 illustrates further details of the covering discs.

A pair of closing disc assemblies 74 (see FIGS. 9 and 10) are provided on the trailing end and on each side of the planter, the disc assemblies 74 each comprising an inner disc 75 mounted by an upright support 76 to a transverse tool bar 77 and an outer disc 78 mounted by an upright support 79 to an arm 80 extending from an end of the tool bar 77 and forwardly thereof relative to the direction of forward movement of the planter 11. The discs 75 and 78 are staggered or overlap each other in their direction of movement and throw or displace soil inwardly over the billets deposited onto the bed to form a raised mound of soil over the billets, the mound having a central apex. The discs 75 and 78 however do not to leave a rill or furrow so that rain water will not accumulate and cause cane billets to rot.

Figure 9:
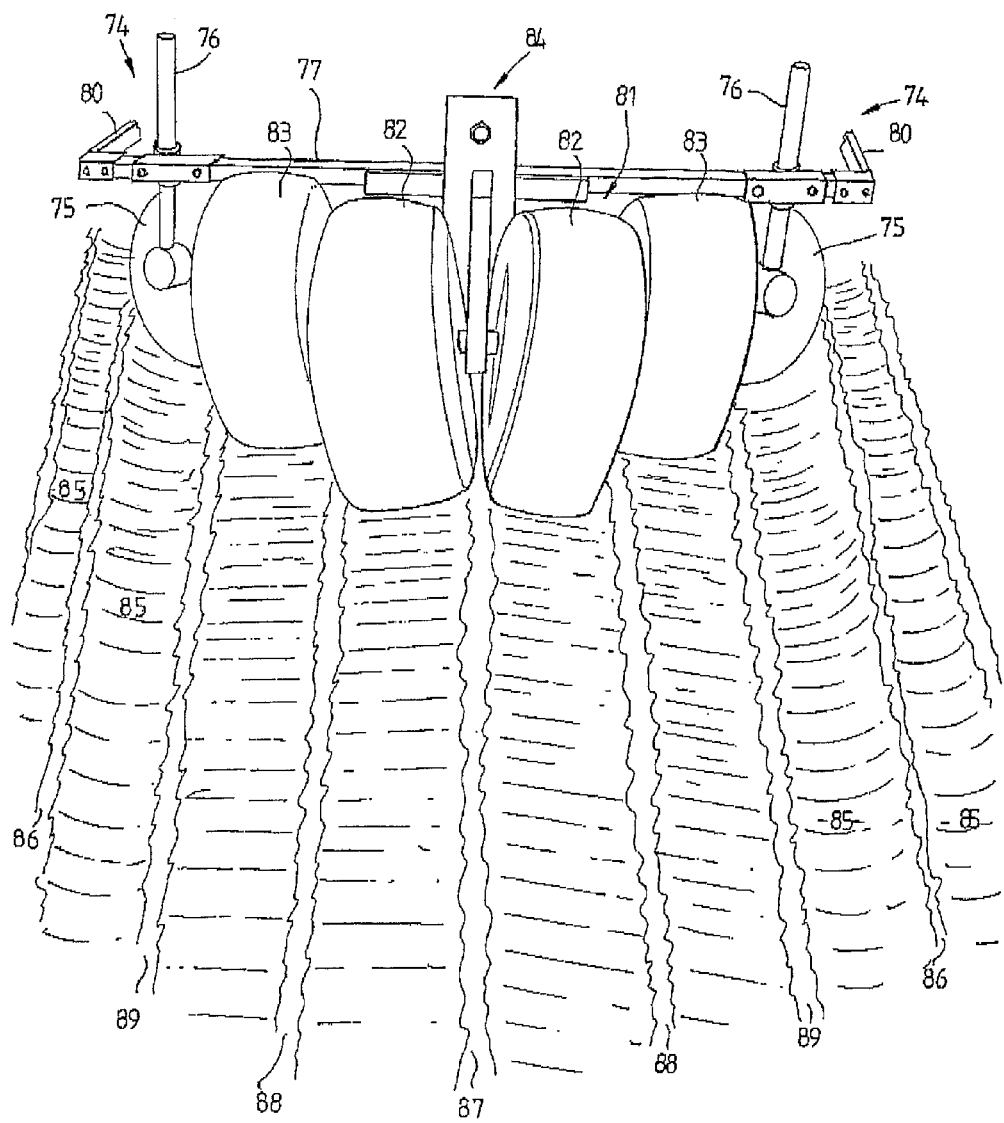
FIG. 9 illustrates the covering discs and wheels of the planter from the rear of the planter.

For pressing the profile in the soil mound made by the billet covering discs 75 and 78, the planter 11 on its trailing end is provided with a central press wheel assembly 81 as shown in FIG. 9 which is arranged inwardly of the disc assemblies 74 and mounted to the transverse tool bar 77 to be longitudinally aligned with the guide or chute 13. The press wheel assembly 81 comprises a pair of inner press wheels or rollers 82 and a pair of outer press wheels or rollers 83 mounted to a central support bracket 84, the wheels 82 and 83 comprising rubber tyred wheels and being supported for free rotation on axes which are inclined downwardly relative to a horizontal plane on opposite sides of the bracket 84. The respective wheels 82 and 83 are thus angled inwardly towards each other whilst the wheels 83 are arranged forwardly of the wheels 82 relative to the normal direction of movement of the planter 11 and slightly outwardly of the wheels 82. As an alternative, the wheels 82 and 83 may be mounted in line along axis extending normal to the direction of movement of the planter with the inclination of the wheels 82 and 83 being achieved by having a common axle on which the wheels 82 and 83 are rotatably mounted angled downwardly at opposite ends.

The bracket 84 is mounted to the tool bar 77 by a spring mounting which applies a downward force on the wheels 82 and 83 so that the wheels 82 and 83 will firmly compact and press soil down over the billets. The compacting wheels 82 and 83 press the soil down so that it does not dry out and are angled such that the respective wheels 82 and 83 form the mound into a slightly convex curved shape in cross section which is angled outwardly and downwardly from the approximately the centre of the mound.

Figures 11, 12:
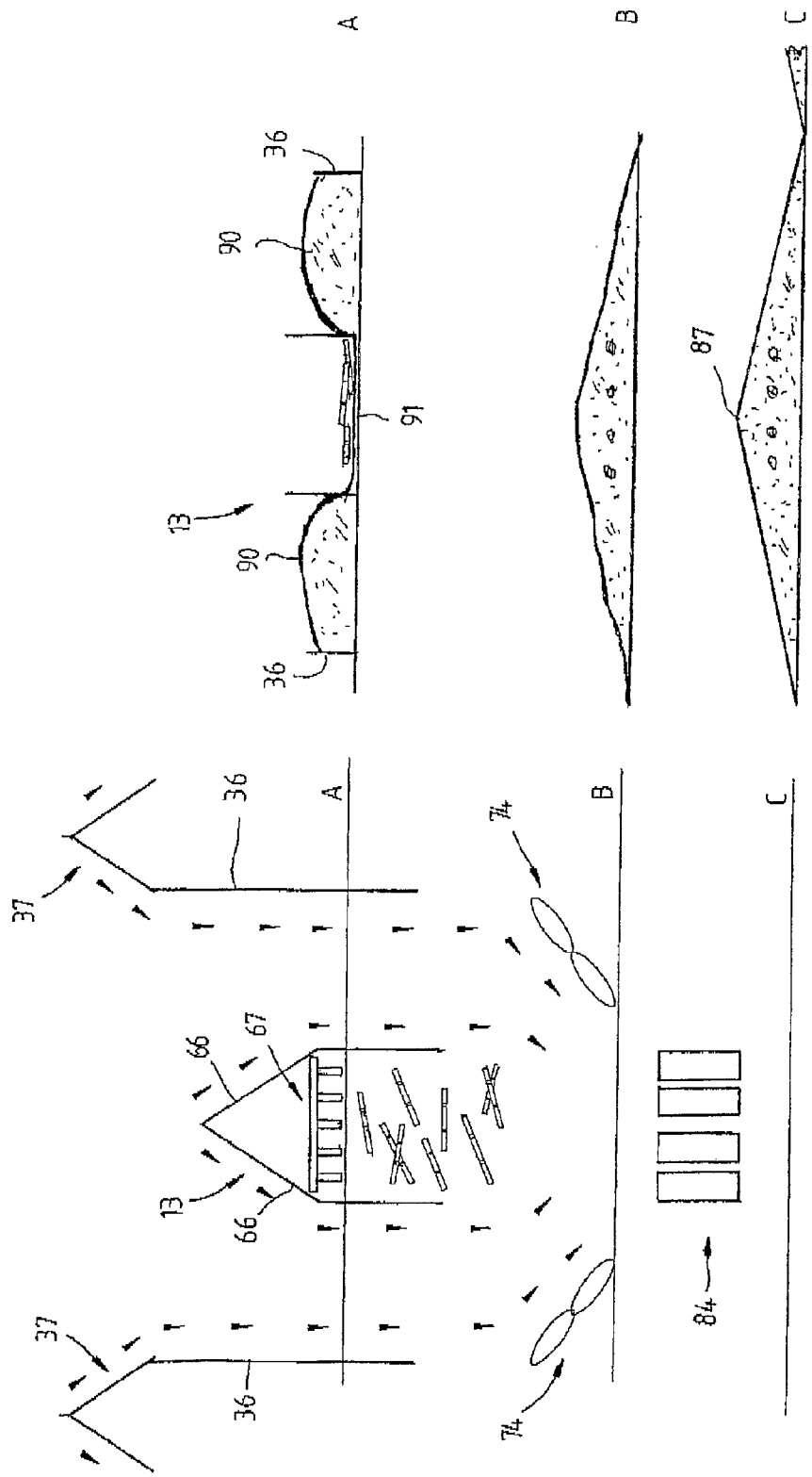
FIG. 11 is a schematic plan view showing the operation of the profiling apparatus.
FIG. 12 are schematic sectional views along lines A, B and C of FIG. 11 showing the formation of the profiled mound over planted billets.

In use, the profiling apparatus 10 is connected to a tractor or other prime mover through the three-point linkage brackets or lugs 19 and 20 and the three point linkage lowered so that the floating frame assembly 21 is supported by the depth wheels 52 and 53 on the ground. The depth wheels are adjusted by means of the turnbuckles 51 and 62 to set the operating depth of the mould board assemblies 34. As the tractor is driven along a field to be planted, the inner mould boards 36 of the respective mould board assemblies 34 displace soil inwardly towards each other with the soil being channeled between the mould board assemblies 34 and guide or chute 13 to form a pair of raised hills or mounds 90 whilst the outer mould boards 36 of each mould board assembly 34 displace soil outwardly to form half mounds on each side of the apparatus 10. This is also shown in FIGS. 11 and 12 where the arrowheads indicate the direction of movement of the soil. The angled walls 66 of the guide or chute 13 will also push soil to a depth of approximately 50 mm to opposite sides to form a generally flat bed 91 between the pair or formed hills or mounds. The height of the mounds 90 can be adjusted by adjusting the pivotal position of the mould boards 36 about a horizontal axis by adjustment of the screw jack 45. Increased inclination of the mould boards 36 will result in a mound of increased height. The width of the mounds can also be adjusted by adjusting the pivotal position of the mould boards 36 about a vertical attitude by adjusting the spacer bars 45 relative to the mould boards 36 to move the mould boards 36 towards or away from each other. As referred to above, the mould board assemblies 34 will jump over any obstructions or stumps encountered due to the upwardly angled leading tip portion 38 of the tip 37.

Billets to be planted are directed through the guide or chute 13 to be deposited on the bottom of the flattened bed between the raised hills or mounds. The prongs 69 of the rake assembly 67 will rake the upper surface of the bed to mix in fertilizer deposited through the ducts 15 into the soil prior to dropping of the billets onto the bed. The prongs 69 will also form grooves or rills in the bed as the planting apparatus 11 which is connected to the profiling apparatus 10 is advanced. The grooves formed in the bed by the prongs of the rake assembly 67 located in the chute 13 tend to locate the billets longitudinally of the bed and across the bed.

As the planter 11 is advanced the covering discs 75 and 78 will displace soil channeled between the mould boards 36 and chute 13 inwardly and cause the planted billets to be covered with a mound of soil and the press wheels 82 and 83 will compress the mound of soil on top of the billets to follow the mound over the billets. As shown in FIG. 9, the discs 75 and 78 will cause concave grooves or channels 85 to be formed in the soil with convex apexes 86 formed in the soil between the grooves 85. The press wheels 82 and 83 will press down the soil and also press a central apex 87 between the inner press wheels 82 and outer apexes 88 between the press wheels 82 and 83. As the press wheels 82 and 83 have their axes of rotation angled downwardly relative to the horizontal, the pressed soil is angled outwardly and downwardly from the apexes 86 and 87. Further apexes 89 are defined between the discs 75 and wheels 83.

The single pass process for planting, mounding by the wheels 82 and 83 and pressing by the discs 75 and 78 means that no further working of the soil is required. The top surface of the soil is angled outwardly and downwardly on opposite sides of the central apex as shown in FIG. 12 at an angle of 10 to 20 degrees to the horizontal which provides the correct bed profile for the base cutters of a cane harvester and reduces the collection of soil by the cane harvester. The width of the mound is adjustable and is at a minimum at spaced positions in alignment with the wheels of the prime mover or the width of the adjustable tools 37 at the front of the apparatus.

The half-mounds formed by the outer mould boards 36 of the mould board assemblies 34 as referred to above serve as a guide for the next pass of the profiling apparatus 10 and planter 11 with the soil engaging tip or point being aligned with that half mound in the return pass. This will result in a series of broad raised mounds having a central raised apex and of convex configuration joining each other as in FIG. 12C so there is no flat ground between the mounds. The soil cover over the billets is adjustable and the apex shaped mound is suited for heavy rain as water will be directed away from the planted billets. The sun will also warm the mound facilitating germination and growth and the mound does not need to be further worked or hilled up.

The outer depth wheels 53 may be laterally adjusted as described with reference to FIG. 7 to be aligned with a previously formed mound or as desired. The depth wheels 53 additionally can be adjusted for different row widths. The mould board assemblies 34 can additionally be adjusted along the lengths of the tool bars 23 and 24 as desired.

The positioning of the upper and lower tool bars 23 and 24 above and below the fixed side arms 18 of the main frame assembly 16 allows limited floating movement of the floating frame assembly 21. When however the three point linkage arms of the tractor are raised, the main frame 17 will be elevated so that the top tool bar 23 rests on the side arms 18 to lift the profiling apparatus out of the ground.

Figure 5:
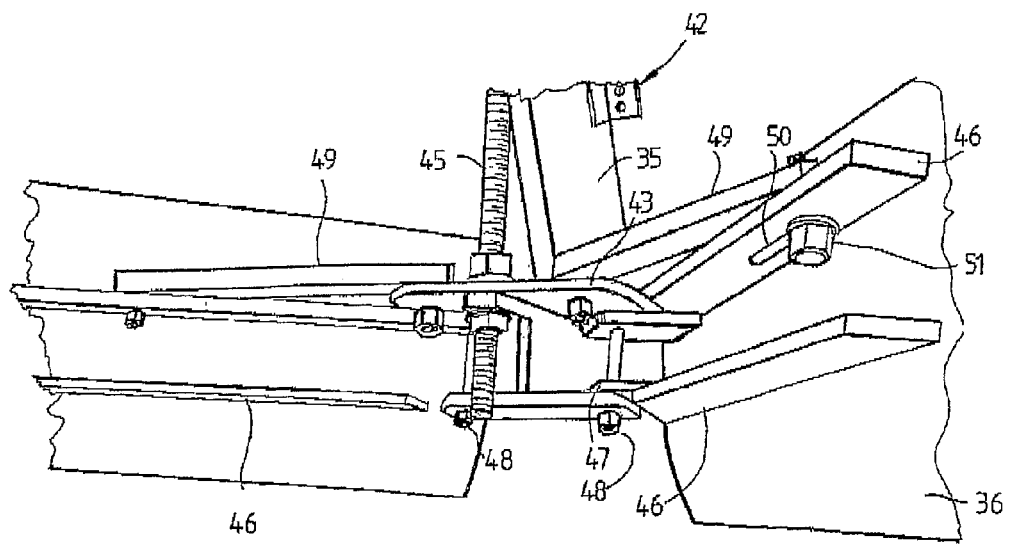
FIG. 5 is a rear view of the mould board assembly.

The profiling apparatus 10 has been described with reference to FIGS. 4 and 5 as having adjustable mould board assembly however the mould board assembly may comprise a fixed non-adjustable tool or shoe in a single piece.

Whilst the profiling apparatus has been described above in association with a planter and for mounting to a planter, it may be incorporated into a planter and formed as part of the planter. Further as described above, the profiling apparatus may be used for forming planter beds in planter applications other than in association with the planting of cane billets. Thus whilst the apparatus has been described in relation to cane billet planting, the apparatus may be applied to a diverse range of farming industries such as cotton, corn, canola etc for forming mounded beds for growing a crop.

The terms "comprising" or "comprises" as used throughout the specification and claims are taken to specify the presence of the stated features, integers and components referred to but not preclude the presence or addition of one or more other feature/s, integer/s, component/s or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

What is claimed is:

1. A profiling apparatus that is operable with a planting apparatus, having a drill for seeds or billets, to facilitate formation of a mound of soil over the seeds or billets, the profiling apparatus comprising:
   (a) a plurality of mound-forming members;
   (b) a support frame having (i) soil-working tools configured to displace soil laterally into the path of the plurality of mound-forming members to form a mound with the soil displaced by the soil-working tools and (ii) gauge wheels on which the support frame rides in use and which are mounted to the frame adjustably to control vertical position of the soil-working tools relative to the ground; and
   (c) a connector extending rearwardly of the support frame to connect the support frame to a planting apparatus such that the soil-working tools lead the drill having regard to the direction of travel of the planting apparatus,
   wherein the support frame is configured to control the depth of soil in the mound by tracking the contours of the ground through the gauge wheels, such that the soil-working tools penetrate the soil to a predetermined soil depth.

2. Profiling apparatus as claimed in claim 1 wherein each soil-working tool comprises a leading tip and spaced profiling board[s] diverging rearwardly from the tip.

3. Profiling apparatus as claimed in claim 1 wherein the mound-forming members are adapted to displace soil laterally inwardly towards each other and over the seed or billets to form the mound.

4. Profiling apparatus as claimed in claim 1 wherein the profiling apparatus further comprises a press wheel assembly.

5. Profiling apparatus as claimed in claim 4 wherein the press wheel assembly has at least one pair of press wheels which have their axes of rotation inclined outwardly and downwardly to form the mound with an apex.

6. Profiling apparatus as claimed in claim 1 wherein the gauge wheels comprise two wheels, each wheel being mounted to a respective opposite side of the support frame, and being laterally adjustable relative to the support frame.

7. Profiling apparatus as claimed in claim 1 wherein the support frame includes a pair of tool bars for supporting the soil-working tools, the tool bars being arranged at different heights and extending transversely of the profiling apparatus, the tool bars extending between and being connected to opposite side members, which are adapted to be mounted directly or indirectly to a planting apparatus to enable each side member to be displaceable vertically independently of the other side member.

8. Profiling apparatus as claimed in claim 7 wherein each said side member is pivotally connected directly or indirectly to one end of a pair of substantially parallel arms, the other end of the arms are adapted to be pivotally mounted to a planting apparatus so as to guide vertical movement of the support frame in parallelism relative to a planting apparatus.

9. Profiling apparatus as claimed in claim 8 further including a fixed frame adapted to be rigidly mounted to the planting apparatus, the fixed frame being adapted to be connected to a prime mover and extends into a space between the upper and lower tool bars to limit vertical movement of the support frame when the upper or lower tool bars contact the fixed frame.

10. Profiling apparatus as claimed in claim 9 wherein said fixed frame comprises a transverse main frame member and respective fixed side members disposed on each end of the transverse member, the side members are adapted to be rigidly connected to planting apparatus, each pair of substantially parallel arms being connected respectively to one end of the side members of the fixed frame.

11. A profiling apparatus as claimed in claim 8, wherein the pairs of substantially parallel arms extend upwardly and forwardly from the planting apparatus to the side members when the profiling apparatus is mounted to a planter in use.

12. A profiling apparatus as claimed in claim 1 wherein the profiling apparatus is configured to produce a mound having a top surface of soil angled downwardly and outwardly from a central apex at an angle in the range of 10 to 20 degrees.

* * * * *